Nov. 23, 1954 S. D. HARPER 2,695,333

ELECTRICAL COMMUNICATION SWITCHING SYSTEM

Filed Aug. 25, 1950 5 Sheets-Sheet 1

SAMUEL D. HARPER
By Hall & Houghton
Attorneys

SAMUEL D. HARPER
By Hall & Houghton
Attorneys

Nov. 23, 1954 S. D. HARPER 2,695,333

ELECTRICAL COMMUNICATION SWITCHING SYSTEM

Filed Aug. 25, 1950 5 Sheets-Sheet 3

SAMUEL D. HARPER

By Hall & Houghton

Attorneys

Nov. 23, 1954 S. D. HARPER 2,695,333

ELECTRICAL COMMUNICATION SWITCHING SYSTEM

Filed Aug. 25, 1950 5 Sheets-Sheet 4

SAMUEL D. HARPER

By Hall & Houghton

Attorneys

Nov. 23, 1954 S. D. HARPER 2,695,333

ELECTRICAL COMMUNICATION SWITCHING SYSTEM

Filed Aug. 25, 1950 5 Sheets-Sheet 5

INVENTOR

SAMUEL DENIS HARPER

BY Hall & Houghton

ATTORNEY 2,695,333

ELECTRICAL COMMUNICATION SWITCHING SYSTEM

Samuel Denis Harper, London, England

Application August 25, 1950, Serial No. 181,394

Claims priority, application Great Britain September 6, 1949

14 Claims. (Cl. 179—15)

This invention relates to electrical communication switching systems and particularly to systems comprising time-division multiplex transmission and switching apparatus as described in the specification of co-pending patent application Ser. No. 56,619, filed October 26, 1948, now Patent No. 2,666,809, issued January 19, 1954.

Figure 4:
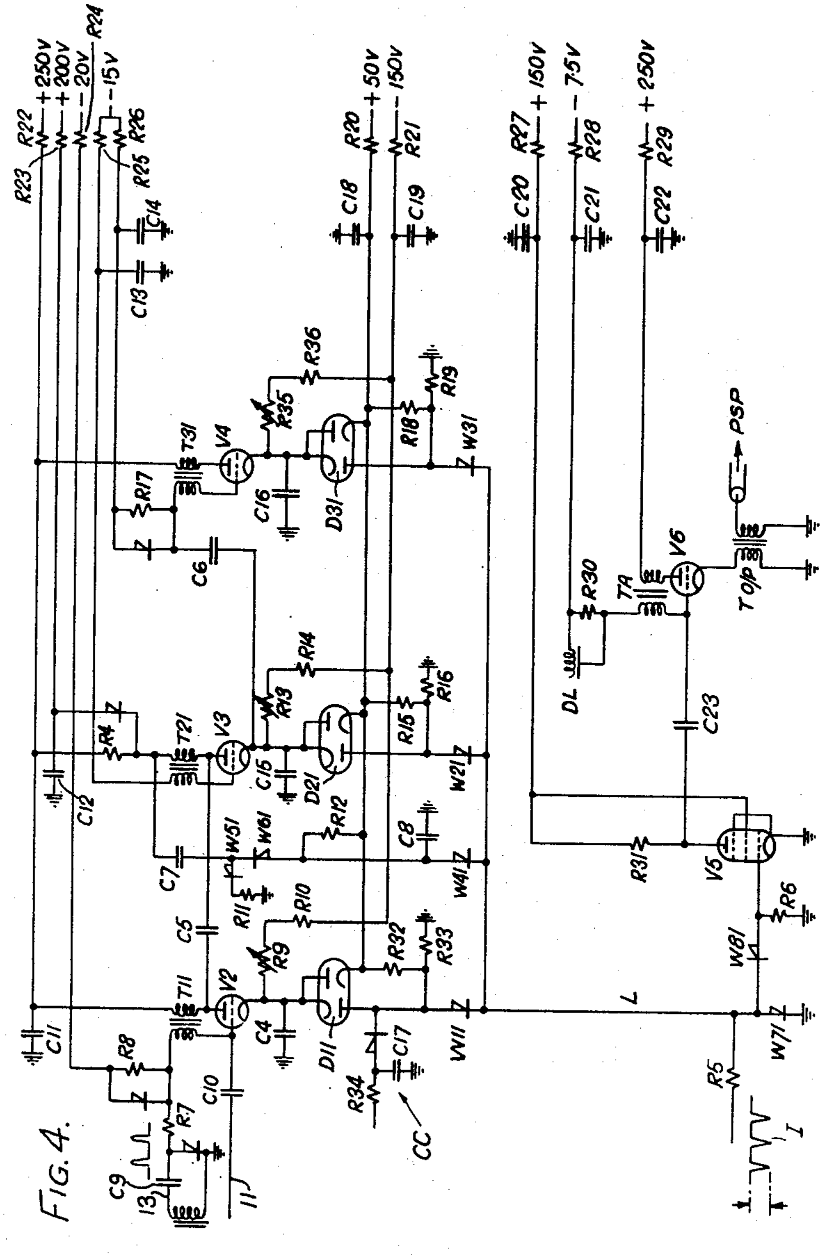
Figure 5:
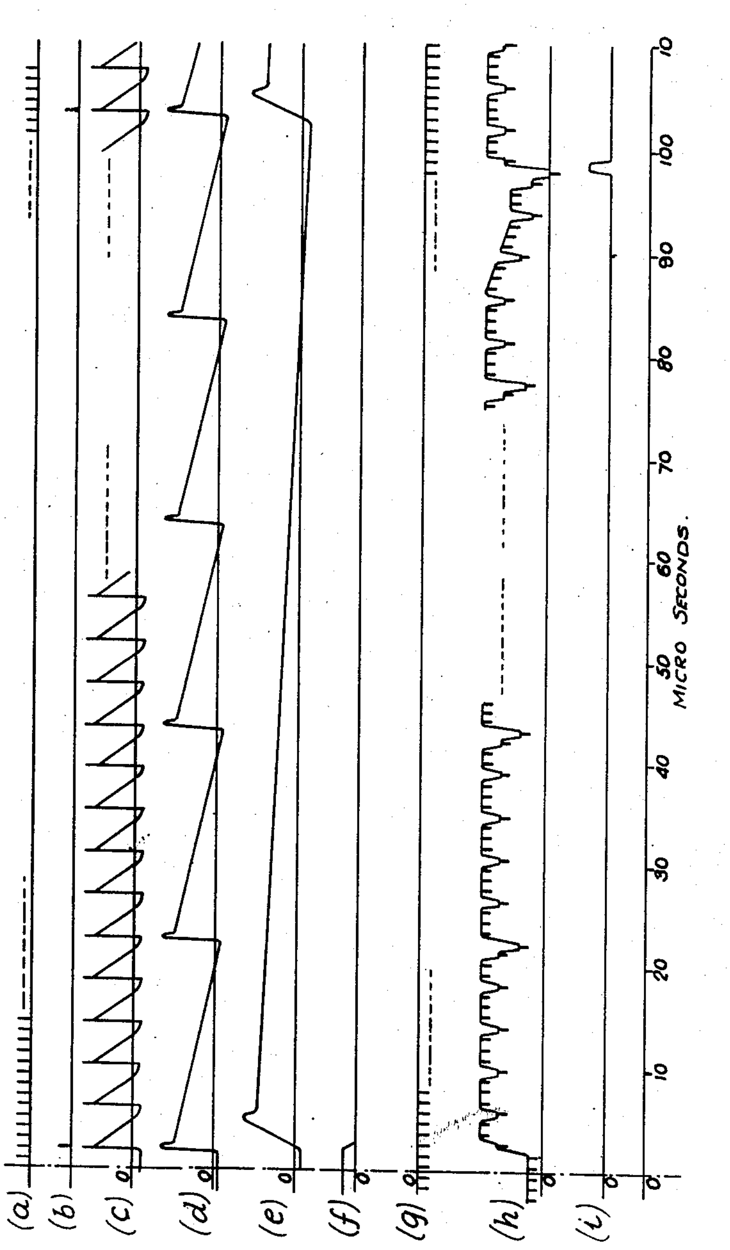
Figure 6:
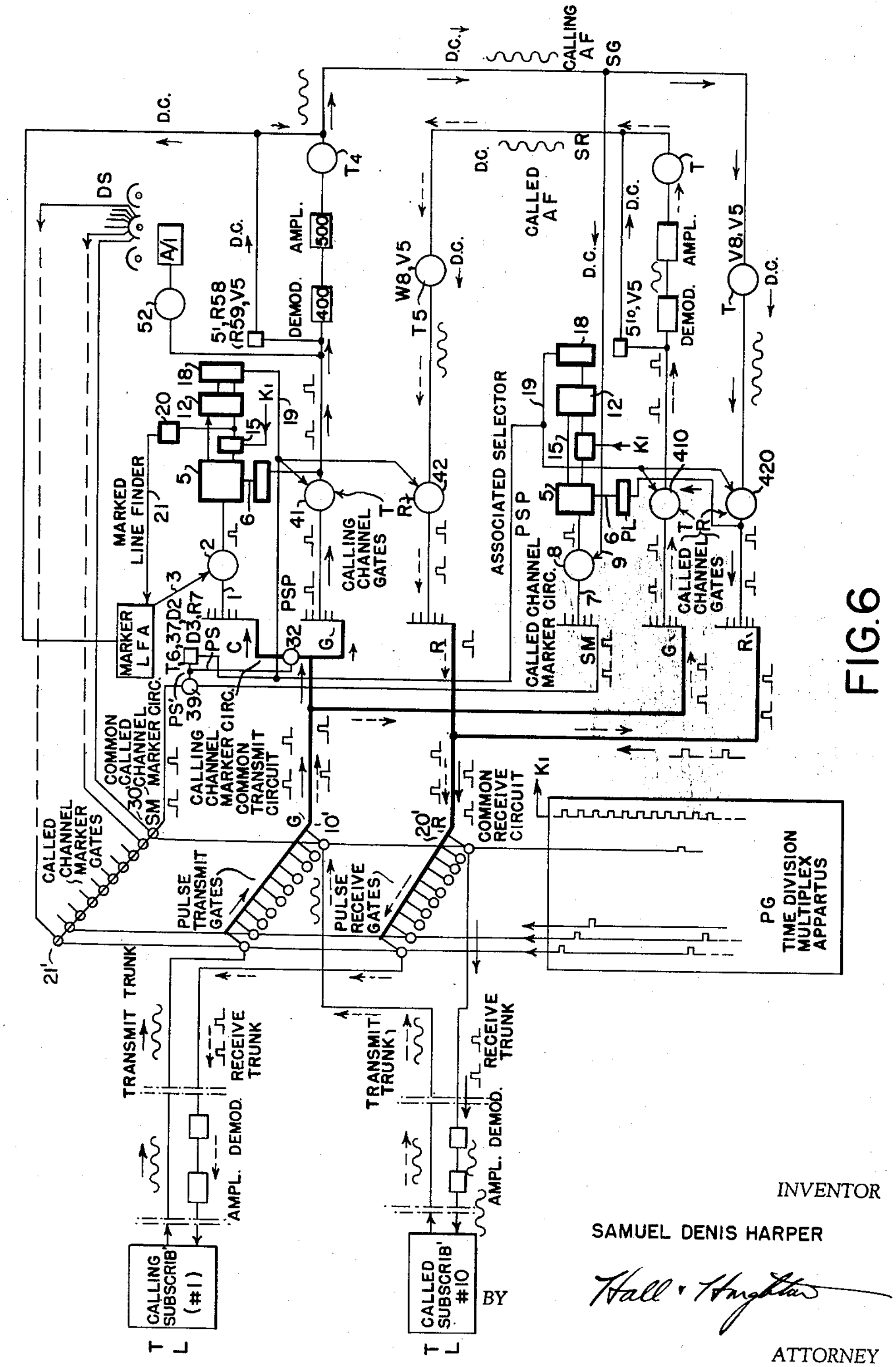

In the accompanying drawings Figs. 1 to 5 are diagrams illustrating improvements of the present invention, and Fig. 6 shows one form thereof incorporated in the general system described in said co-pending application. For convenience the elements newly combined in the system by the present invention are shown in heavier lines, the portions corresponding to those in the co-pending disclosure being shown in lighter lines.

As indicated in Fig. 6, the specification referred to describes a multiplex communication system in which signals are applied to a single circuit G and a plurality of other circuits are each connected at desired spaced time intervals with the single circuit, intermittently actuated gating devices 41 serving to place the single circuit in operative connection with one of the other circuits at the desired time intervals. The single circuit may constitute a single highway or channel and the other circuits referred to may consist of trunks each associated with a gating device 41 arranged to control the connection of a trunk with the highway or channel, a gating device being intermittently actuated to connect a trunk to a highway for transmission of signals thereon to the trunk at such time intervals as signals appear on the highway.

The specification referred to also describes the use of a plurality of circuits (e. g. TL#1) connected to a time-division multiplex system which produces on a common highway G, which will be termed the transmission channel, a channel pulse corresponding to each circuit which is in the engaged condition, the channel pulse being amplitude modulated by the speech currents which are transmitted over the circuit. No pulse corresponding to a circuit appears on the transmission channel when the circuit is disengaged. Each pulse on the transmission channel G is communicated to a further channel C, which will be termed the calling pulse channel, in dependence on a switching device 32 not being actuated when the impulses of the pulse occur, the switching device being actuated over a common channel PS which will be termed the pulse suppression channel. A plurality of trunks are each terminated on a line-finder (Fig. 6, upper right) connected to the transmission, calling pulse and pulse suppression channels. A free line-finder when marked (at 2) by a trunk marker LFA is adapted to respond to an impulse over the calling pulse channel C and thereafter to generate a pulse the impulses of which overlay in time the impulses of a channel pulse to one of the impulses of which the line-finder has responded over the calling pulse channel.

A further plurality of trunks (e. g. TL#10), each terminated on a selector (Fig. 6, lower right), may be connected to the transmission channel G, to the pulse suppression channel C and to a still further channel SM over which a pulse synchronous with the channel pulse of a called circuit is communicated or not communicated by a line marker DS, 21′—30′ in dependence on a further switching device 39 not being actuated when the impulses of the pulse occur, the further switching device being actuated over the pulse suppression channel PS′. This still further channel SM will be termed the marking pulse channel. A free selector, when marked by a trunk marker 9, is adapted to respond (at 8) to an impulse over the marking pulse channel SM and thereafter to generate a pulse the impulses of which overlay in time the impulses of a called channel pulse.

It will be appreciated that in a system of this sort the common buses with circuits at each end gated thereto on predetermined, and on selected, time division channels respectively, constitute a switch, and for convenience of reference, that end of the switch to which circuits are gated each on its own predetermined time division channel may be called the "bank side" of the switch, and that end to which other circuits are connected on time division channels selected to synchronize with the channels of bank side circuits may be termed the "selector side" of the switch. It will be understood that a line finder is a specialized selector.

The generated pulse of both line finders and selectors, which will be termed the pulse suppression pulse is adapted to actuate the switching devices 32 and 39 associated with the calling pulse and marking pulse channels C or SM over the pulse suppression channel PS and in combination with further apparatus to actuate intermittently the said gating means 41, 42; 410, 420 and thus to select the required channel pulse.

The means described in the specification of the application referred to for generating the pulse suppression pulse PSP utilise a pulse K1 common to all line-finders and selectors connected to a multiplex, the period of the common pulse K1 being equal to the spacing of the time-spaced channel pulses of the multiplex and the impulses of the common pulse being synchronised with the impulses of the channel pulses. Each line-finder and selector includes a timing device comprising a supersonic delay line which when actuated by an impulse, produces an output impulse a predetermined time later, the timing device being actuated first by an impulse over the calling pulse or marking pulse channel C or SM and thereafter by a common pulse impulse K1 selected by an output impulse, the output impulses constituting the pulse suppression pulse.

The object of the present invention is to provide alternative means for generating the pulse suppression pulse.

According to the present invention, in a modification of a system of the kind described, each line finder and selector includes a timing device comprising a condenser and resistance and which, when actuated by an impulse, charges the condenser which then discharges through the resistance to cause an output impulse a predetermined time later, the timing device being actuated first by an impulse over the calling pulse or marking pulse channel C or SM and thereafter by a common pulse impulse K1 selected by an output impulse, the output impulses constituting the pulse suppression pulse PSP.

In a particular application of the invention, each line finder and selector includes a plurality of timing devices each comprising a condenser and resistance and which, when actuated by an impulse, charges the condenser which then discharges through the resistance to cause an output signal a predetermined time later, a first timing device being actuated first by an impulse over the calling pulse or marking pulse channel and thereafter by a common pulse impulse selected by an output signal caused by the timing device, each further timing device being actuated by an output signal selected by its own output signal from amongst the output signals from another one of the timing devices. All of the timing device output signals are communicated to a pulse generator which generates an impulse when all the timing devices simultaneously communicate an output signal, the impulses generated by said generator constituting the pulse suppression pulse.

In a further application of the invention, the means provided for generating the pulse suppression pulse are actuated by first and second pulses common to all line finders and selectors connected to a multiplex, the period of the common pulses are equal to the spacing of the time spaced channel pulses of the multiplex and the impulses of the first common pulse K1 are synchronised with the impulses of the channel pulses while the impulses of the second common pulse are displaced in time relation to the channel impulses by a predetermined fraction of the channel spacing. Each line finder and selector includes a timing device comprising a condenser and resistance and which, when actuated by an impulse, charges the condenser which then discharges through the resistance to cause first and second output signals at predetermined times later, the timing device being actuated first by an impulse over the calling pulse or marking pulse channel C or SM and thereafter by a first common pulse impulse K1 selected by a second output signal. A pulse generator operates to generate an impulse when actuated by a second common pulse impulse selected by a first output signal, the impulses generated by the pulse generator constituting the pulse suppression pulse.

According to a modification of the last mentioned application of the invention, a plurality of timing devices are provided each comprising a condenser and resistance and which, when actuated by an impulse charges the condenser which then discharges through the resistance to cause in the case of a first timing device first and second output signals at predetermined times later and in the case of a second and each further timing device a signal output signal at a predetermined time later, a first timing device being actuated first by an impulse over the calling pulse or marking pulse channel and thereafter by a first common pulse impulse selected by a second output signal, a second timing device being actuated by a second output signal, each further timing device being actuated by a single output signal selected by its own output signal from amongst the single output signals from another one of the second and further timing devices. Output signals from all the timing devices and the second common pulse are communicated to a pulse generator which generates an impulse when actuated by an impulse of the second common pulse whilst also simultaneously having communicated to it a first output signal from the first timing device and single output signals from second and all further timing devices.

Figure 1:
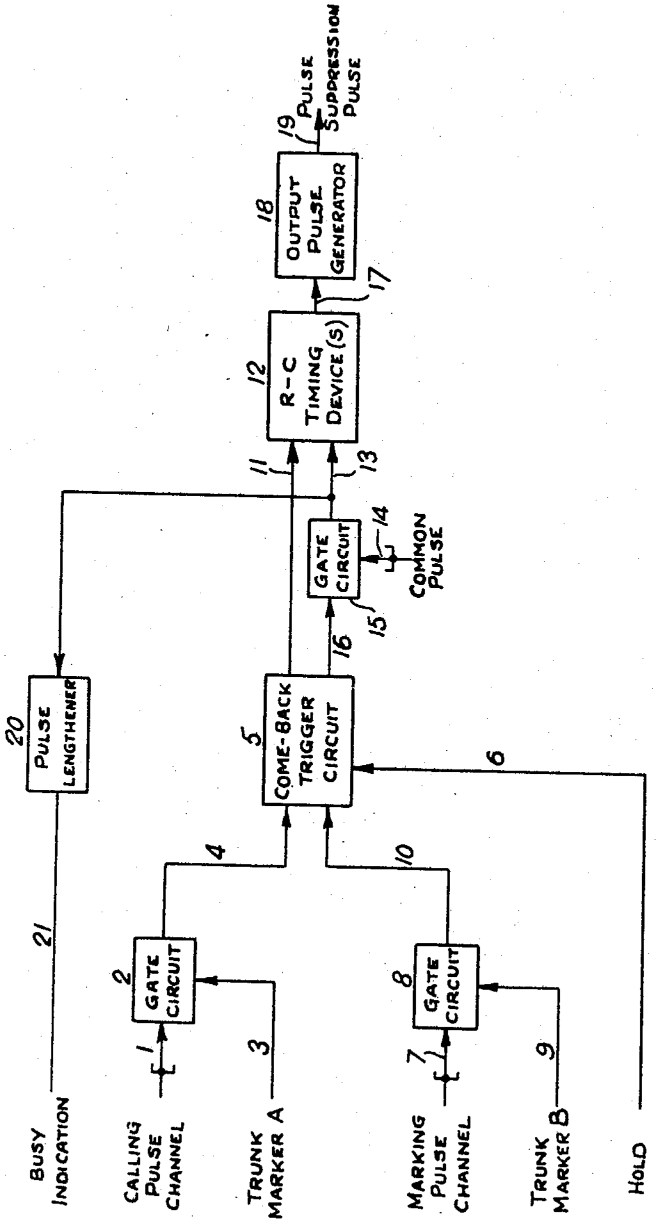
Figure 2:
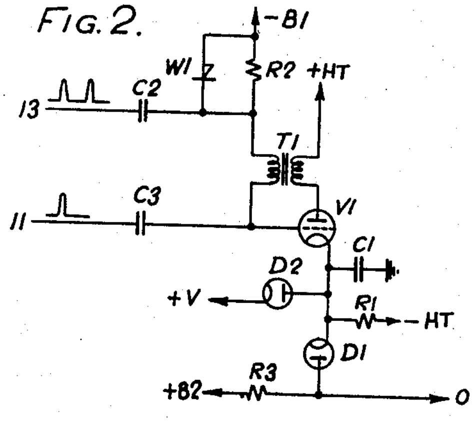
Figure 3:
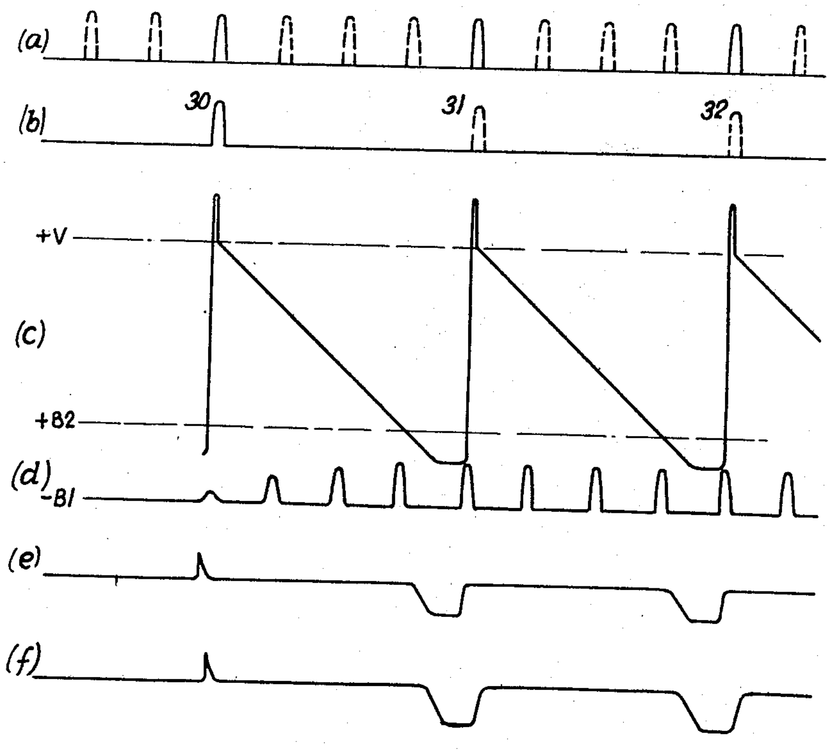

In order that the invention may be more clearly understood circuit arrangements for generating a pulse suppression pulse in accordance therewith, will now be described in greater detail by way of example with reference to Figs. 1–5 of the accompanying drawings in which:

Fig. 1 is a block diagram showing the main component circuits of a selector,

Fig. 2 shows a simple form of timing device for use in a system having only a few channels, Fig. 3 shows wave forms explanatory of the operation of the circuit shown in Fig. 2, Fig. 4 is a circuit arrangement including three timing devices and intended for use in a system having a relatively large number of channels and Fig. 5 shows waveforms explanatory of the operation of certain of the valves shown in Fig. 4.

The line finders and selectors described in the specification previously referred to differ principally in that whereas the line finder responds to an impulse over the calling pulse channel C, the selector responds to an impulse over the marking pulse channel SM. Response to impulses over either of these channels is under the control of gate circuits (2 and 8 in Fig. 6, herein) operated by trunk markers. By connecting the selectors to the calling pulse channel via gate circuits operated by trunk markers it becomes possible to use the selectors for line finding as well as for selecting. For the purpose of this specification the term line finder will be omitted and it is to be understood that the selector to be described is capable of operating as either a line finder or a selector according to the specification referred to.

Referring to Fig. 1 of the drawings, impulses received over a calling pulse channel 1 pass through gate circuit 2 when the selector is marked by a trunk marker A over lead 3, to operate over lead 4 a "come-back" trigger circuit 5. Trigger circuit 5 is of the kind which, when operated by an impulse, remains operated for a predetermined time and then, unless held operated by a D. C. Hold signal applied over lead 6, returns to the unoperated condition. Trigger circuit 5 may also be operated over lead 10 by an impulse over a marking pulse channel 7, via the gate circuit 8 controlled by a trunk marker B over lead 9. Whilst in the operated condition trigger circuit 5 is insensitive to impulses over leads 4 and 10. Operation of trigger circuit 5 is signalled with minimum delay by an impulse over lead 11 to an R–C timing device or devices 12 and this signal is followed by the impulses of a common pulse over lead 13 to which lead they have been switched from lead 14 by the operation of gate circuit 15 by a D. C. signal over lead 16 from trigger circuit 5. The timing device or devices, having been started by an impulse over lead 11 substantially synchronous with the impulse over the calling pulse channel which operated the trigger circuit, now becomes synchronised to the impulses of the common pulse and proceeds to communicate a signal or signals over lead or leads 17 to an output pulse generator 18 which generates accordingly the pulse suppression pulse which appears on lead 19.

As a result of the generation of the pulse suppression pulse a Hold signal under the control of one or more of the stations between which connection is being made, appears over lead 6 to prevent the natural release of trigger circuit 5. Subject to the maintenance of the Hold signal therefore, the selector continues to emit the pulse suppression pulse and effects the desired connection. On the disappearance of the Hold signal, the trigger circuit 5 releases, causing the disappearance of the common pulse impulses on lead 13 and the timing devices cease to signal the output pulse generator and the pulse suppression pulse ceases.

The specification of the application referred to requires that a selector shall indicate to a trunk marker whether the selector is in the engaged or free condition. In Fig. 1 the engaged indication is signalled over lead 21 as a D. C. signal derived from a pulse lengthener circuit 20 which is supplied with the impulses appearing on lead 13 when the selector is engaged. Alternatively the engaged indication may be obtained from the trigger circuit 5.

Gate circuits 2, 8 and 15 may comprise pentode valves operating in well-known manner as suppressor grid switched amplifiers. The pulse lengthener 20 may comprise a condenser charged through a rectifier by the impulses on lead 13. Trigger circuit 5 may comprise a pair of multi-electrode valves having direct coupling between the anode of the second and the control grid of the first and capacitance coupling between the anode of the first and the control grid of the second, the biassing of the said grids being such that the anode of the first valve is normally non-conducting and that of the second valve normally conducting. If the trigger be operated by an impulse of suitable polarity applied to the control grid of either valve it will remain operated for a time dependent at least in part on the time constant of the control grid circuit of the second valve. If during the operated time of the trigger a Hold signal in the form of a negative potential be applied to the control or suppressor grid of the second valve, the trigger will be held in the operated condition for at least the duration of the Hold signal.

Many circuits are known to those skilled in the art by means of which the component circuits 2, 5, 8, 15 and 20 may be constructed and therefore in the interests of simplicity the circuit description which follows is limited to the R–C timing device or devices 12 and the pulse suppression pulse generator 18.

Fig. 2 illustrates one form of timing device suitable for use in a system having a relatively small number of channels, and the waveforms of Fig. 3 are drawn to illustrate the action of the circuit of Fig. 2 when that circuit is adjusted to effect the selection of one channel pulse in a four channel system. The timing device comprises a multi-electrode vacuum tube V1 and transformer T1 connected regeneratively as a blocking oscillator. The control grid is biassed via one winding of the transformer and a resistor R2 to a potential —B1 more negative than the cathode by at least the grid base of the valve. A rectifier W1 is connected across the resistor R2 to facilitate the flow of grid current. Between the cathode of V1 and earth is connected a capacitor C1. When a positive going impulse of sufficient amplitude on lead 11 of Fig. 1 and Fig. 2 is applied via a capacitor C3 to the control grid, the blocking oscillator impulses and rapidly charges capacitor C1 to a positive potential. At the end of the blocking oscillator impulse the control grid rapidly returns to the bias potential —B1 and the cathode potential returns more slowly during which time the oscillator is insensitive to further impulses applied to the control grid. Capacitor C1 is preferably discharged at substantially constant current via a resistor R1 connected to a supply potential —HT which is negative with respect to the cathode by several times the voltage through which C1 is discharged. A diode D1 connects the cathode through a resistor R3 to a supply potential +B2, the potential so applied and the value of R3 being selected so that the discharge of C1 is arrested at earth potential. It has been found that the stability of the discharge time of capacitor C1 is improved by the addition of a second diode D2 connected to a stable supply potential +V so that D2 conducts at the peaks of the charging cycles. The periods during which D2 conducts are represented by the pips *p* on the tops of the triangular cathode waves represented by the waveform (*c*) in Fig. 3, now to be referred to.

In Fig. 3 waveform (*a*) represents the time spaced channel pulses of a four channel multiplex system. The heavily drawn impulses represent the pulse to be suppressed. Waveform (*b*) represents the calling or marking pulse which is applied to lead 11 of Fig. 1 and Fig. 2, impulse 30 being the first appearance. Waveform (*c*) shows the rise in potential on the cathode of V1 as a result of impulse 30. The cathode rises above the clamp potential +V, returning to that potential in a short time dependent on the natural impulse duration of the blocking oscillator. Thereafter the potential on the cathode falls progressively at a rate dependent on the value of the capacitor C1 and the discharge current. Waveform (*d*) shows the impulses of the common pulse appearing on lead 13 of Figs. 1 and 2. It will be seen that the switching speed of the gate circuit 15 of Fig. 1 needs to be such, for this example, that the common pulse is fully established on lead 13 in four channel spacings. Capacitor C1 and the discharge current are chosen in relation to the discharge voltage range +V so that the cathode attains earth potential in approximately three and a half channel spacings whereupon the oscillator becomes quiescent until triggered approximately half a channel spacing later by an impulse of the common pulse. The initial waveform is then repeated every four channel spacings until such time as the action is interrupted by, for example, cessation of the common pulse. Waveform (*e*) is that of the potential changes occurring across the resistor R3, these changes constituting a pulse which is taken off from a lead O. This pulse after amplification not shown, is transmitted to the switching devices referred to, to effect suppression of the further impulses 31, 32 etc. of the calling or marking pulse. It will be seen that the impulses on the lead O occur a little early with respect to the impulses to be suppressed hence some delay or impulse lengthening is required in the circuit comprising the amplifier, transmission to, and operation of the switching devices. In practice, at the high speed of operation for which the invention is suitable such delay at least in part is unavoidable and indeed a feature of the invention lies in the fact of such delay being tolerable. The addition of delay supplementary to the unavoidable delay may, if necessary, be made by means of a delay line. Waveform (*f*) depicts the pulse suppression pulse delay as mentioned. An alternative method of handling the pulse suppression pulse comprising an amplifier and triggered impulse generator is described later in this specification.

The timing device described with reference to Fig. 2 is sufficiently stable for operation in a multiplex system having only a small number of channels N1 but means will now be described by which stable operation may be obtained in a system having a large number of channels. If a second timing device constructed on similar lines to that described, which will now be called the first timing device, but having a discharge time approximating closely to an integral number N2 of discharge times of the first, be triggered by impulses derived from the blocking oscillator in the first timing device then the potential on the lead O of the second timing device will describe a pulse having an impulse spacing of N1 times N2 channels. If the signals emitted on the leads O of the two timing devices be communicated to a coincidence circuit, an output pulse is obtained having impulses substantially as those on lead O of the first timing device but having a separation of N1×N2 channels. Similarly by providing a third timing device having a discharge time approximating to an integral number N3 of discharge times of the second timing device triggered by impulses from the second timing device, three signals may be combined in a coincidence circuit to provide an output pulse having, an impulse separation of N1×N2×N3 channels. The process may be extended to more than three timing devices and indeed by varying the number of timing devices and the discharge times thereof and suitably modifying the scope of the coincidence circuit, an arrangement of the type described may be constructed to suit a multiplex system of any number of channels although in practice difficulty may arise with numbers having factors greatly exceeding five.

Fig. 4 shows an arrangement of three timing devices in tandem having discharge times such that the first blocking oscillator selects and triggers to every fourth common pulse impulse, the second selects and triggers to every fifth impulse on the anode of the first blocking oscillator and the third selects and triggers to every fifth impulse on the cathode of the second blocking oscillator. The signals emitted by these three timing devices coincide every 4×5×5=100 channel spacings, giving a pulse suppression pulse suitable for a 100 channel multiplex system. The circuit of Fig. 4 includes a number of features not previously referred to which are equally applicable to arrangements having other than three timing devices.

Of the three timing devices shown in Fig. 4 and including the blocking oscillator valves V2, V3, V4 and diodes D11, D21 and D31 respectively, the third timing device is similar in all respects to that described with reference to Fig. 2. The second differs only from that described in that an amplitude limited pulse is derived from a resistor R4 in the anode circuit of the blocking oscillator V3 for a purpose to be explained later, and in that the oscillator is triggered by a negative going pulse applied to the anode instead of by a positive going pulse on the grid. The first timing device is a modification of that already described in that the discharge of the cathode capacitor C4 is arrested by an additional clamp circuit CC in series with the diode D11, which is the equivalent of diode D1 of Fig. 2, instead of by D11 alone. By this means the cathode potential of valve V3 immediately before this oscillator is triggered, may be more negative than that at which D11 conducts and in consequence a signal is obtained, when D11 conducts, in advance of the selection by the timing device of a triggering impulse from the common pulse.

An additional feature of the arrangement of Fig. 4 is the provision of a second common pulse similar in all respects to the first common pulse except that negative going impulses delayed with respect to the impulses of the first common pulse by part of a channel spacing are employed. The output signals emitted from the timing devices when the diodes D11, D21 and D31 conduct, are combined in a coincidence circuit, including rectifiers W11, W21 and W31 to select an impulse from the second common pulse, said selected impulse after amplification by a valve V5 being used to trigger an impulse regenerator valve V6 the output impulses from which constitute the pulse suppression pulse. The valve V6 comprises a triggered blocking oscillator provided with a delay line DL for impulse duration control. A transformer T O/P serves to couple the cathode of the valve to the pulse suppression pulse output lead PSP.

The circuit of Fig. 4 has been found to operate satisfactorily, with the component values stated in the table given below, in conjunction with a 100 channel multiplex system employing channel and common impulses of approximately $0.2\times10^{-6}$ seconds duration and having a channel spacing of $1.0\times10^{-6}$ seconds.

*Table*

[pf.=picofarad=micro-microfarad, k=1000, mf.-microfarad.]

| | |
|---|---|
| C1=560 pf. | R3=3.0 k ohms |
| C2=270 pf. | R4=2.2 k ohms |
| C3=220 pf. | R5=10.0 k ohms |
| C4=560 pf. | R6=7.5 k ohms |
| C5=30 pf. | R7=220.0 ohms |
| C6=82 pf. | R8=8.2 k ohms |
| C7=0.002 mf. | R9=5.0 k ohms |
| C8=0.003 mf. | R10=15.0 k ohms |
| C9=270 pf. | R11=15.0 k ohms |
| C10=220 pf. | R12=39.0 k ohms |
| C11=1.0 mf. | R13=5.0 k ohms |
| C12=1.0 mf. | R14=30.0 k ohms |
| C13=1.0 mf. | R15=20.0 k ohms |
| C14=1.0 mf. | R16=3.6 k ohms |
| C15=0.00156 mf. | R17=1.0 k ohms |
| C16=0.00715 mf. | R18=20.0 k ohms |
| C17=1.0 mf. | R19=3.6 k ohms |
| C18=1.0 mf. | R20=100.0 ohms |
| C19=1.0 mf. | R21=100.0 ohms |
| C20=1.0 mf. | R22=220.0 ohms |
| C21=1.0 mf. | R23=220.0 ohms |
| C22=1.0 mf. | R24=470.0 ohms |
| C23=100 pf. | R25=100.0 ohms |
| | R26=100.0 ohms |
| R1=5 k ohms | R27=330.0 ohms |
| R2=8.2 k ohms | R28=100.0 ohms |

*Table*—Continued

| | |
|---|---|
| R29=330.0 ohms | R33=3.6 k ohms |
| R30=27.0 k ohms | R34=47.0 ohms |
| R31=3.3 k ohms | R35=5.0 k ohms |
| R32=20.0 k ohms | R36=30.0 k ohms |

The multi-electrode valves may all be of type CV138, triode connected where shown. The thermionic diodes may be of type CV140 and the rectifiers may be of type CV425. Suitable turns ratios for the oscillator transformers are as follows, T11—50:50; T21—100:100; T31—175:175; TA—125:125 and T O/P 40 turns in the cathode winding and 17 in the secondary. The delay line should in the example being described, be constructed to have a delay of 0.4 micro-second and a characteristic impedance of 1200 ohms.

The operation of the circuit will be described with reference to the timing diagram Fig. 5, in which waveform (*a*) represents the first common pulse the impulses of which are synchronous with the channel impulses. Two successive impulses of the pulse to be suppressed are shown in waveform (*b*). If now the first of the two impulses of waveform (*b*) be applied to lead 11, Fig. 4, to trigger the first blocking oscillator V2 and, simultaneously, if the common pulse of waveform (*a*) be switched to lead 13 of Fig. 4, as described with relation to lead 13 of Fig. 2, then the cathode of the oscillator V2 will undergo the potential changes depicted by waveform (*c*). In consequence of the coupling provided by the capacitor C5 between the anode of valve V2 and the anode of valve V3 and that provided by the capacitor C6 between the cathode of valve V3 and the grid circuit of valve V4, all three blocking oscillators trigger together in response to the first impulse applied over lead 11.

Waveforms (*d*) and (*e*) respectively portray the potential changes on the cathodes of the oscillators V3, V4. Coincidence of the signals emitted when the diodes D11, D21 and D31 conduct is effected by an arrangement of current switching rectifiers W11, W21 and W31 each of which, when the associated diode D11, D21 or D31 is non-conducting, feeds a current I1 via a common lead L and rectifier W71 to earth, and when the said associated diode conducts, switches off the current I1. Impulses I negative with respect to earth are communicated to lead L via a resistor R5 which limits the peak impulse current I2 to a value less than I1. The control grid of the normally conducting amplifying valve V5 is connected to the lead L through a rectifier W81 and to earth via a grid leak resistor R6. Rectifier W81 is connected so that when W71 conducts, W81 is in the backed off condition and when W71 is backed off, W81 conducts. So long as at least one of the diodes D11, D21, D31 is conducting A current I1, rectifier W71 remains conducting and the control grid of the amplifier V5 is unaffected by the impulses of the second common pulse, but when all three of said diodes cease to conduct an impulse of the second common pulse is switched to the control grid of the amplifier V5 from the anode of which a positive-going impulse is transmitted to trigger the delay line (DL) controlled blocking oscillator valve V6.

It will be appreciated that as so far described, impulses from the second common pulse would feed to the amplifier continuously when the selector, of which the timing devices form a part, is disengaged, for then all three diodes D11, D21, D31 are conducting. This may be avoided by arranging to switch the second common pulse on and off as is done for the first common pulse, or alternatively the second common pulse may be derived by delay line and polarity inversion direct from the switched first common pulse. In the example of Fig. 4, however, the impulses of the second common pulse are rendered ineffective, when the selector is disengaged by the provision of a current I3, greater than I2, flowing to the lead L via a rectifier W41. When the selector becomes engaged, the three timing devices operate and the previously mentioned amplitude limited pulse available on the anode of the second blocking oscillator V3 is employed in conjunction with a feed capacitor C7, having a limited direct current restoring rectifier W51 in series with a resistor R11, and a charging rectifier W61 and a storage capacitor C8, to back off rectifier W41 continuously until the selector is released, and so switch off the current I3.

Waveform (*f*) indicates the current I3 in the lead L. Waveform (*g*) represents the second common pulse and waveform (*h*) above the zero line, represents the current in W71 and below the zero line the current in W81. Waveform (*i*) shows the first regenerated impulse of the pulse suppression pulse.

It will be appreciated that circuits for generating the pulse suppression pulse may take forms other than those described and the details of design of the timing devices may be modified to suit particular requirements.

I claim:

1. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a calling pulse train channel, switching means responsive to pulses of said channel pulse trains and serving to control the communication of pulses in said common signal circuit to said calling pulse train channel, a pulse train suppression channel for controlling said switching means, a line finder, means for connecting said line finder to said common signal circuit, said calling pulse train channel and said pulse train suppression channel, pulse suppression pulse train generating means comprising in combination, a common pulse train source, the pulses of the common pulse train being synchronous with the pulses of said channel pulse trains and the period of the common pulse train being equal to the spacing of said channel pulse trains, a timing device comprising a capacitor and a resistor, means for applying to said timing device a pulse from said calling pulse train channel to cause said capacitor to be charged, said capacitor then being discharged through said resistor so as to produce an output pulse after a predetermined period, means for applying to said timing device a pulse from pulse train source selectively co-operative with an output pulse, said pulse suppression pulse train being constituted by a plurality of such output pulses and means for utilising said pulse suppression pulse train to effect intermittent actuation of said gate circuit means.

2. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a calling pulse train channel, switching means responsive to pulses of said channel pulse trains and serving to control the communication of pulses in said common signal circuit to said calling pulse train channel, a pulse train suppression channel for controlling said switching means, a line finder, means for connecting said line finder to said common signal circuit, said calling pulse train channel and said pulse train suppression channel, pulse suppression pulse train generating means comprising in combination, a common pulse train source, the pulses of the common pulse train being synchronous with the pulses of said channel pulse trains and the period of the common pulse train being equal to the spacing of said channel pulse trains, a timing device comprising a capacitor and a resistor, means for applying to said timing device a pulse from said calling pulse train channel to cause said capacitor to be charged, said capacitor then being discharged through said resistor so as to produce an output pulse after a predetermined period, means for applying to said timing device a pulse from said common pulse train source selectively co-operative with an output pulse, means for applying said output pulse to pulse train generating means the output of which constitutes said pulse suppression pulse train and means for utilising said pulse suppression pulse train to effect intermittent actuation of said gate circuit means.

3. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a calling pulse train channel, switching means responsive to pulses of said channel pulse trains and serving to control the communication of pulses in said common signal circuit to said calling pulse train channel, a pulse train suppression channel for controlling said switching means, a line finder, means for connecting said line finder to said common signal circuit, said calling pulse train channel and said pulse train suppression channel, pulse suppression pulse train generating means comprising in combination, first and second common pulse train sources, the period of each common pulse train being equal to the spacing of the channel pulse trains, the pulses of the first common pulse train being synchronous with the pulses of the channel pulse trains and the pulses of the second common pulse train being displaced in time relation to the pulses of the channel pulse trains by a selected fraction of said spacing, a timing device comprising a capacitor and a resistor, means for applying to said timing device a pulse from said calling pulse train channel to cause said capacitor to be charged, said capacitor then being discharged through said resistor so as to produce an output after a predetermined period, means for applying to said timing device a pulse from said first common pulse source selected by output pulses, means responsive to pulses from said second common pulse source selected by said output pulses to generate pulses which constitute said pulse suppression pulse train and means for utilising said pulse suppression pulse train to effect intermittent actuation of said gate circuit means.

4. A communication system according to claim 1 and including a plurality of timing devices, a first timing device being actuated first by a pulse from a calling pulse train channel and thereafter by common pulse train pulses selected by an output pulse of said first timing device, each further timing device being actuated by the output pulse selected by its own output pulse from amongst the output pulses from another one of said timing devices and means responsive to the output pulses from all timing devices to transmit a first timing device output pulse only when all timing devices simultaneously communicate output pulses, the transmitted pulses constituting the pulse suppression pulse train.

5. A system according to claim 1 and including a plurality of timing devices, a first timing device being actuated first by a pulse from a calling pulse train channel and thereafter by common pulse train pulses selected by an output pulse of said first timing device, each further timing device being actuated by an output pulse selected by its own output pulse from amongst the output pulses from another one of said timing devices and means responsive to the output pulses from all timing devices to generate pulses only when all timing devices simultaneously communicate output pulses the pulse so generated constituting the pulse suppression pulse train.

6. A communication system according to claim 3 and including a plurality of timing devices, a first timing device being actuated first by a pulse from a calling pulse train channel and thereafter by first common pulse train pulses selected by an output pulse of said first timing device, each further timing device being actuated by an output pulse selected by its own output pulse from amongst the output pulses from another one of said timing devices and means responsive to second common pulse train pulses and output pulses to generate pulses when actuated by second common pulse train pulses whilst also having communicated to it output pulses from all said timing devices, the generated pulses constituting said pulse suppression pulse train.

7. A communication system according to claim 3 and including a plurality of timing devices and in which a first timing device, when actuated by a pulse, produces a first output pulse and a second output pulse a predetermined time later and in the case of a second and each further timing device, when actuated by a pulse, produces a single output pulse a predetermined time later, a first timing device being actuated first by a pulse from a calling pulse train channel and thereafter by a first common pulse train pulse selected by a second output pulse, a second timing device being actuated by a second output pulse selected by an output pulse from the second timing device, each further timing device being actuated by a single output pulse selected by its own output pulse from amongst the single output pulses from another one of the second and further timing devices and means responsive to the second common pulse train and output pulses from all timing devices to generate pulses when actuated by a pulse of the second common pulse train whilst also simultaneously having communicated to it a first output pulse from the first timing device and single output pulses from second and all further timing devices.

8. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a marking pulse train channel, switching means responsive to pulses of said channel pulse trains and serving to control the communication of pulses in said common signal circuit to said marking pulse train channel, a pulse train suppression channel for controlling said switching means, a selector, means for connecting said selector to said common signal circuit, said marking pulse train channel and said pulse train suppression channel, pulse suppression pulse train generating means comprising in combination, a common pulse train source, the pulses of the common pulse train being synchronous with the pulses of said channel pulse trains and the period of the common pulse train being equal to the spacing of said channel pulse trains, a timing device comprising a capacitor and a resistor, means for applying to said timing device a pulse from said marking pulse train channel to cause said capacitor to be charged, said capacitor then being discharged through said resistor so as to produce an output pulse after a predetermined period, means for applying to said timing device a pulse from said common pulse train source selectively co-operative with an output pulse, said pulse suppression pulse train being constituted by a plurality of such output pulses and means for utilising said pulse suppression pulse train to effect intermittent actuation of said gate circuit means.

9. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a marking pulse train channel, switching means responsive to pulses of said channel pulse trains and serving to control the communication of pulses in said common signal circuit to said marking pulse train channel, a pulse train suppression channel for controlling said switching means, a selector, means for connecting said selector to said common signal circuit, said marking pulse train channel and said pulse train suppression channel, pulse suppression pulse train generating means comprising in combination, a common pulse train source, the pulses of the common pulse train being synchronous with the pulses of said channel pulse trains and the period of the common pulse train being equal to the spacing of said channel pulse trains, a timing device comprising a capacitor and a resistor, means for applying to said timing device a pulse from said marking pulse train channel to cause said capacitor to be charged, said capacitor then being discharged through said resistor so as to produce an output pulse after a predetermined period, means for applying to said timing device a pulse from said common pulse train source selectively co-operative with an output pulse, means for applying said output pulse to pulse train generating means the output of which constitutes said pulse suppression pulse train and means for utilising said pulse suppression pulse train to effect intermittent actuation of said gate circuit means.

10. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a marking pulse train channel, switching means responsive to pulses of said channel pulse trains and serving to control the communication of pulses in said common signal circuit to said marking pulse train channel, a pulse train suppression channel for controlling said switching means, a selector, means for connecting said selector to said common signal circuit, said marking pulse train channel and said pulse train suppression channel, pulse suppression pulse train generating means comprising in combination, first and second common pulse train sources, the period of each common pulse train being equal to the spacing of the channel pulse trains, the pulses of the first common pulse train being synchronous with the pulses of the channel pulse trains and the pulses of the second common pulse train being displaced in time relation to the pulses of the channel pulse trains by a selected fraction of said spacing, a timing device comprising a capacitor and a resistor, means for applying to said timing device a pulse from said marking pulse train channel to cause said capacitor to be charged, said capacitor then being discharged through said resistor so as to produce an output after a predetermined period, means for applying to said timing device a pulse from said first common pulse source selected by output pulses, means responsive to pulses from said second common pulse source selected by said output pulses to generate pulses which constitute said pulse suppression pulse train and means for utilising said pulse suppression pulse train to effect intermittent actuation of said gate circuit means.

11. A communication system according to claim 8 and including a plurality of timing devices, a first timing device being actuated first by a pulse from a marking pulse train channel and thereafter by common pulse train pulses selected by an output pulse of said first timing device, each further timing device being actuated by the output pulse selected by its own output pulse from amongst the output pulses from another one of said timing devices and means responsive to the output pulses from all timing devices to transmit a first timing device output pulse only when all timing devices simultaneously communicate output pulses, the transmitted pulses constituting the pulse suppression pulse train.

12. A system according to claim 8 and including a plurality of timing devices, a first timing device being actuated first by a pulse from a marking pulse train channel and thereafter by common pulse train pulses selected by an output pulse of said first timing device, each further timing device being actuated by an output pulse selected by its own output pulse from amongst the output pulses from another one of said timing devices and means responsive to the output pulses from all timing devices to generate pulses only when all timing devices simultaneously communicate output pulses the pulses so generated constituting the pulse suppression pulse train.

13. A communication system according to claim 10 and including a plurality of timing devices, a first timing device being actuated first by a pulse from a marking pulse train channel and thereafter by first common pulse train pulses selected by an output pulse of said first timing device, each further timing device being actuated by an output pulse selected by its own output pulse from amongst the output pulses from another one of said timing devices and means responsive to second common pulse train pulses and output pulses to generate pulses when actuated by second common pulse train pulses whilst also having communicated to it output pulses from all said timing devices, the generated pulses constituting said pulse suppression pulse train.

14. A communication system according to claim 10 and including a plurality of timing devices and in which a first timing device, when actuated by a pulse, produces a first output pulse and a second output pulse a predetermined time later and in the case of a second and each further timing device, when actuated by a pulse, produces a single output pulse a predetermined time later, a first timing device being actuated first by a pulse from a marking pulse train channel and thereafter by a first common pulse train pulse selected by a second output pulse, a second timing device being actuated by a second output pulse selected by an output pulse from the second timing device, each further timing device being actuated by a single output pulse selected by its own output pulse from amongst the single output pulses from another one of the second and further timing devices and means responsive to the second common pulse train and output pulses from all timing devices to generate pulses when actuated by a pulse of the second common pulse train whilst also simultaneously having communicated to it a first output pulse from the first timing device and single output pulses from second and all further timing devices.

References Cited in the file of this patent

UNITED STATES PATENTS

| Number | Name | Date |
|---|---|---|
| 2,553,605 | Ransom | May 22, 1951 |